May 15, 1928.
M. J. WEBER
1,669,685
LENS CLOSER
Filed July 22, 1926
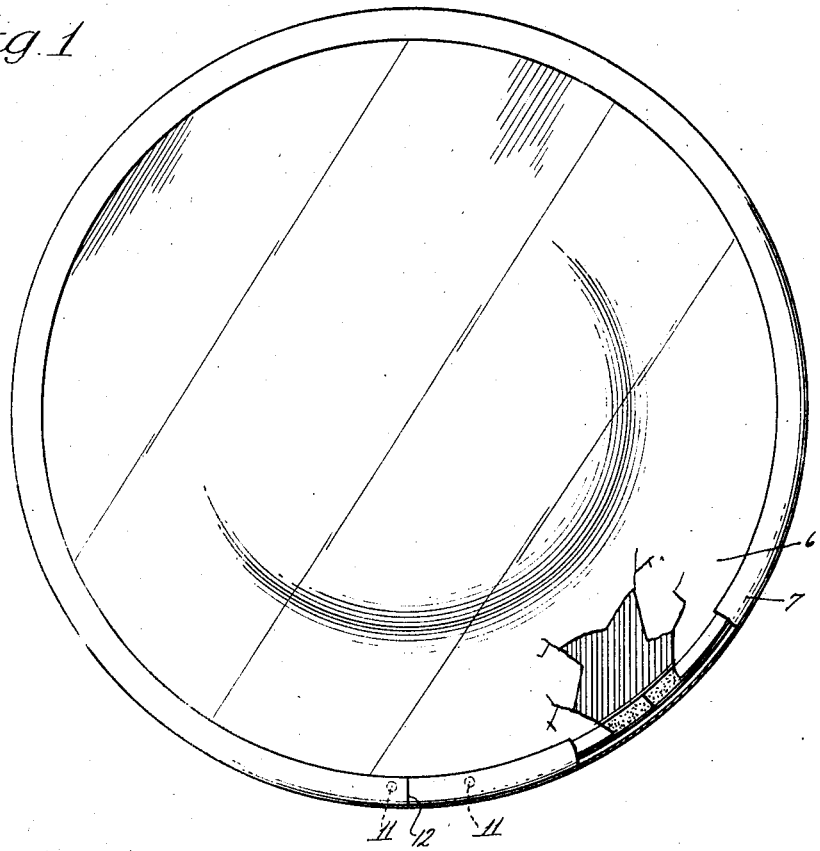
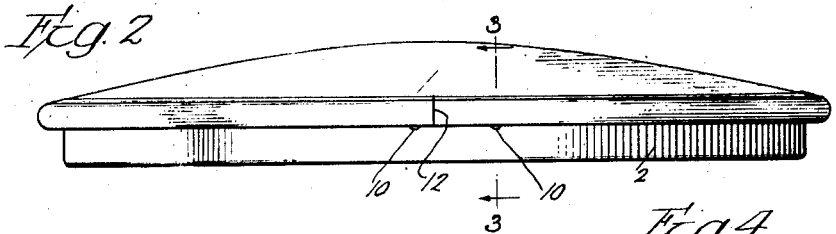
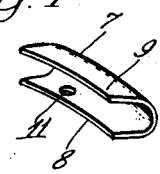
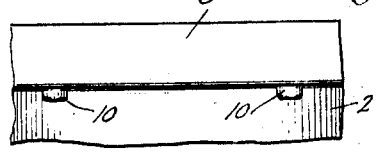
Inventor:
Mathias J. Weber
By Munday, Clarke & Carpenter
Attys.

Patented May 15, 1928.

1,669,685

UNITED STATES PATENT OFFICE.

MATHIAS J. WEBER, OF CHICAGO, ILLINOIS, ASSIGNOR TO THE HEALTH-O-METER COMPANY, OF CHICAGO, ILLINOIS, A CORPORATION OF ILLINOIS.

LENS CLOSER.

Application filed July 22, 1926. Serial No. 124,255.

This invention relates to devices for securing a lens or glass in position within the casing of a headlight or a glass in position in the casing of an indicator dial. For the purposes of illustration, I have disclosed one embodiment of my invention as a device constructed and arranged for attaching and holding in place a glass closing the front of a scale or indicator dial of a weighing machine, such as the type of dial disclosed in my prior Patent No. 1,382,699 of June 28, 1921, but it is, of course, obvious that my present invention is broadly adapted for use wherever suitable.

One of the objects of my invention resides in providing a simple closing device for forming a tight closing seal for the transparent glass or lens which is to be held in a casing, such, for instance, as a lens closure or an indicator dial or the like.

Another object of my invention is to provide a closing device of the above character, comprising a split annulus of substantially U-shaped cross section providing resilient flanges adapted to circumferentially engage and overlie the glass member and the opposite facing of the casing, respectively, the ends of the annulus, where it is split, being provided with tits or perforations adapted to engage complemental perforations or tits on the casing so as to hold the annulus in place, whereby the annulus firmly clamps the glass member and casing together in a substantially dust-proof and water-tight manner.

Other objects and advantages of the invention will be apparent as it is better understood from the following description, which, taken in connection with the accompanying drawings, discloses a preferred embodiment thereof.

Referring to the drawings:

Figure 1 of the drawings discloses a front view of my closing member as applied to an indicator dial or the like;

Fig. 2 is an edge view thereof;

Fig. 3 is a section on line 3—3 of Fig. 2;

Fig. 4 is a partial perspective view of the closing annulus.

Fig. 5 is an enlarged view of the locking tits on the inside of the casing.

Referring now to my invention in detail and to one form thereof as exemplified in the drawings, wherein my improved device is shown as applied for fastening glass cover in position on the scale pan of an indicating dial for a weighing scale, the upper portion of the scale pan is shown as at 1. This comprises the usual type round pan like member, the bottom of which is adapted to receive the printed indicating dial, which, of course, is circular. The scale pan is provided with an upstanding flange indicated at 2, which terminates in a lateral flange 3, in which is inserted a circular gasket 4. The lateral flange 3 terminates in an upstanding lip 5. The glass or other transparent member for the scale dial, indicated at 6, which in the present invention is preferably convexed, is placed in position so that the bottom edge of the glass rests upon the gasket 4.

My invention resides in providing a simple type of means for firmly holding the glass 6 in place in assembled position in the scale pan, so as to provide a substantially dust-proof and water-tight closure, and preferably one that can be easily and quickly assembled and disassembled.

In the present form of my invention, the device comprises a split annulus 7, which is shown clearly as substantially U-shaped in cross section, this ring being made of metal, the flanges 8 and 9 are substantially resilient, and it is preferred to make this ring of cross section so that the space between the flanges 8 and 9 is slightly narrower than the distance between the under side of the horizontal flange 3 and the top face of the glass 6, so that when the annulus is placed in position circumferentially on the pan and glass these flanges 8 and 9 will firmly grip the top of the glass and the under side of flange 3. In order to firmly lock the split annulus in position, I provide the annulus in the under side of the casing with co-operating locking tits and perforations. In the form of the invention illustrated, I provide the flange 3 of the scale pan with a plurality of punch-outs 10, desirably spaced apart, and I provide the adjacent ends of the annulus, preferably on a flange side with substantial perforations or punch-out holes 11, which are of sufficient diameter to slip on and receive the punch-outs or tits 10. Obviously, the arrangement of perforations 11 and the tits 10 may be reversed if desired.

In assembling my improved closure, when the glass 6 has been placed in position as shown in Figure 3, the split annulus is slipped on to the assembled glass and scale pan with the substantially longer flange 9 overlying the glass 6. The split ends of the annulus may then be sprung into position, the perforation 11 in one of the ends slipping over one of the tits 10, and the perforation 11 in the opposite split end slipping over the other punch-out or tit 10. It will be noticed that the resiliency of the metal flanges 8 and 9 and the fact that these flanges are slightly closer together than the combined thickness of the scale and glass assembled permits the apertures in the flanges to snap over the tits or punch-outs 10. It will be noticed that the spacing of the tits 10 and the perforations 11 are arranged so that when assembled the split ends 12 of the annulus are drawn tightly together.

As before stated, this invention is not limited in its embodiment to glass covers for the dials of weighing scales but is clearly applicable to glass headlights, spotlights and any other type of device.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. In a device of the class described, the combination of a circular casing having suitable flanges forming a gasket seat, a gasket positioned on said seat, a transparent disk positioned on said gasket to close said casing and a split annulus of substantially U-shaped form encircling said casing and glass, one of the flanges of said annulus overlapping the circumferential edge of the glass and the other overlying one of the faces of the said casing, said face of the casing and the free edges of the split annulus having spaced perforations and tits constructed and arranged to be engaged, whereby to hold the casing, the glass and the split annulus in locking position with the free edges of the split annulus drawn substantially close together.

2. A device of the class described, the combination of a casing formed with a circumferential flange to provide a seat, a glass closure disposed on said seat and a split annulus encircling the circumferential juncture of the glass and flange, said split annulus being of U-shaped cross section and having the flanges thereof overlying the glass and casing flange to close the same, the casing flange having spaced punch-outs or tits and the adjacent edges of the split annulus having correspondingly sized perforations adapted to slip over the tits when the annulus is in assembled position.

3. In a device of the class described, the combination of a scale pan having a circumferential flange portion adapted to receive a glass closure, a channel shaped metal ring split and adapted to embrace the flange portion of the scale pan and the edge of the ring circumferentially thereof, the flange portion of the scale pan being provided with spaced punch-outs and the meeting edges of the split ring being provided with perforations whereby in assembling the ring and the glass and flanged portion of the scale pan the punch-outs on the flange portions of the scale pan are adapted to fit in the perforations in the split ring, whereby to draw together the split edges of the ring and hold the same securely in position, so as to provide a substantially air-tight dust-proof closure for the circumferential juncture of the glass and scale pan.

4. A device of the class described, the combination of a circular casing having a flange portion, a glass closure for said casing, a split annulus of substantially U-shaped form adapted to be positioned circumferentially on said casing and glass with one of the flanges overlapping the flange of the casing and the other flange overlapping the glass, the adjacent split edges of the annulus having spaced perforations adapted to receive therein spaced projections on the face of the flange, whereby to hold the split annulus in locking position on the glass and flange with the split adjacent edges of the annulus drawn substantially closely together.

MATHIAS J. WEBER.